United States Patent [19]

Warner et al.

[11] 4,123,403

[45] Oct. 31, 1978

[54] CONTINUOUS PROCESS FOR PREPARING AQUEOUS POLYMER MICROSUSPENSIONS

[75] Inventors: Gregory L. Warner; Douglas E. Leng, both of Midland, Mich.

[73] Assignee: The Dow Chemical Company, Midland, Mich.

[21] Appl. No.: 810,221

[22] Filed: Jun. 27, 1977

[51] Int. Cl.² .............................................. C08J 3/06
[52] U.S. Cl. ...................... 260/29.2 EP; 260/29.2 E; 260/29.2 N; 260/29.2 TN; 260/29.6 NR; 260/29.6 PM; 260/29.6 WA; 260/29.7 PT; 270/29.7 WA; 526/88; 528/499
[58] Field of Search ................ 260/29.2 EP, 29.6 NR, 260/29.2 N, 29.2 TN, 29.2 E, 29.6 PM, 29.7 PT, 29.6 WA, 29.7 WA; 526/88; 528/499

[56] References Cited

U.S. PATENT DOCUMENTS

| 2,653,919 | 9/1953 | Hunter | 260/23 H |
|---|---|---|---|
| 2,872,427 | 2/1959 | Schroeder | 260/13 |
| 3,055,853 | 9/1962 | Pickell | 260/23 H |
| 3,127,152 | 3/1964 | Schrenk et al. | 259/6 |
| 3,130,959 | 4/1964 | Schrenk et al. | 259/9 |
| 3,131,910 | 5/1964 | Schrenk et al. | 259/12 |
| 3,176,965 | 4/1965 | Schrenk et al. | 259/105 |
| 3,245,934 | 4/1966 | Krzyszkowski | 260/29.6 PM |
| 3,422,049 | 1/1969 | McClain | 260/29.6 PM |
| 3,432,483 | 3/1969 | Peoples et al. | 260/29.6 XA |
| 3,746,681 | 7/1973 | McClain | 260/29.2 N |
| 3,879,324 | 4/1975 | Timmons et al. | 260/29.2 N |

FOREIGN PATENT DOCUMENTS

| 876,153 | 7/1971 | Canada. | |
| 905,718 | 9/1962 | United Kingdom | 260/29.6 PM |

Primary Examiner—Eugene C. Rzucidlo
Attorney, Agent, or Firm—James B. Guffey

[57] ABSTRACT

Aqueous polymer microsuspensions having controlled particle size and narrow particle size distribution are prepared by a continuous process comprising the steps of (a) forming a heterogeneous composition having a discontinuous aqueous phase and a continuous polymer phase; and (b) converting the resulting polymer-continuous heterogeneous composition to a water-continuous heterogeneous composition.

18 Claims, 2 Drawing Figures

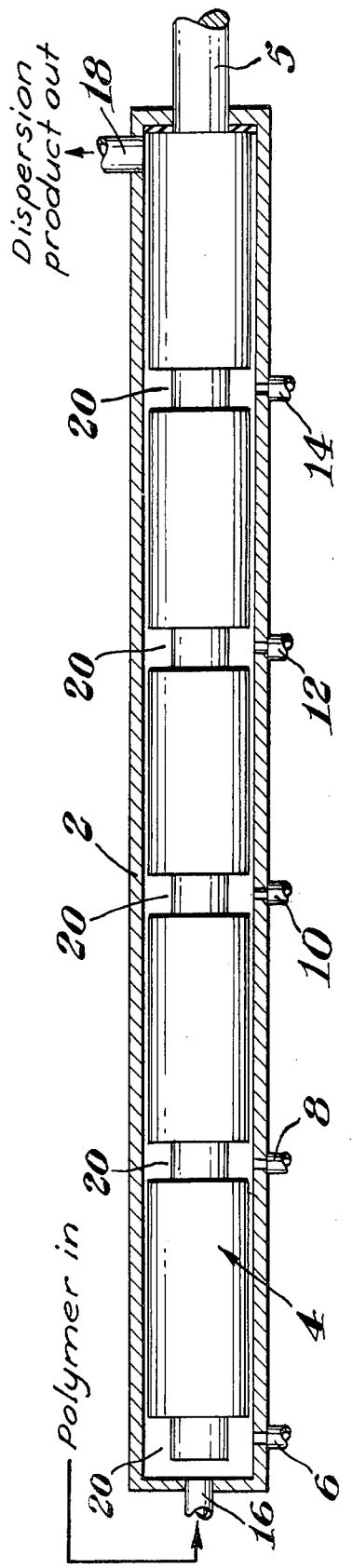
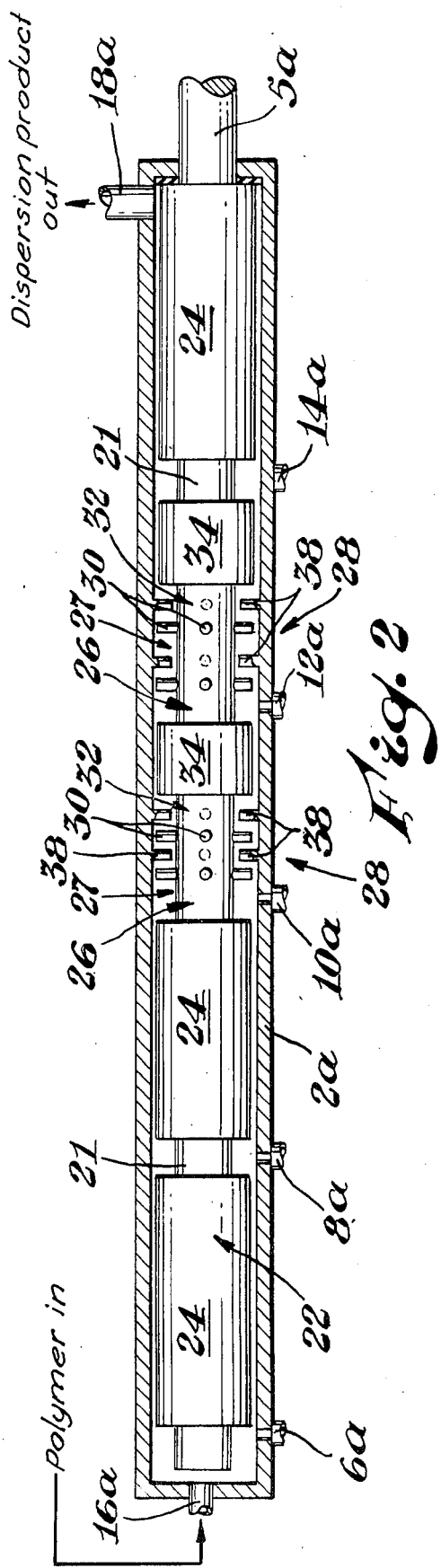

CONTINUOUS PROCESS FOR PREPARING AQUEOUS POLYMER MICROSUSPENSIONS

BACKGROUND OF THE INVENTION

This invention relates to aqueous dispersions of polymers and to methods for the preparation thereof.

Aqueous dispersions of polymers have been prepared in the prior art by emulsion polymerization methods as well as suspension polymerization methods. The former methods are limited to the use of monomers which polymerize under emulsion polymerization conditions and further to applications which can utilize dispersions having average polymer particle diameters less than about 0.5 micron. The latter methods are sometimes undesirable because the resulting dispersions have undesirably large average particle diameters.

Many known and potential applications require aqueous dispersions which, for one reason or another, are not easily prepared by either emulsion or suspension polymerization methods. Various methods have been developed to prepare such dispersions. For example (as shown in U.S. Pat. Nos. 2,653,919; 3,055,853; 3,356,629; 3,432,483; 3,642,676; 3,746,681; 3,847,886 and 3,879,324) the polymer has been dispersed directly into the aqueous phase, usually with the aid of a solvent for the polymer and an emulsifying agent. Such methods are disadvantageous because the solvent is expensive, hazardous and difficult to recover for reuse. Further, residual solvent often left in the polymer impairs polymer properties. Moreover, if large quantities of solvent are not used in such direct dispersion methods, a very difficult mixing problem is presented which requires high temperatures and intensive agitation (with correspondingly high energy usage) to achieve adequate dispersion. High temperatures for prolonged periods often degrade the dispersing agents as well as the polymer. More importantly, the particle sizes of the dispersed polymer are not uniform and are difficult to control.

Indirect dispersion processes (often called inversion processes) have also been used to prepare polymer dispersions. In a typical inversion process, a water-in-polymer emulsion is first prepared by adding, with agitation, a small amount of water to a liquefied polymer medium. Subsequently, the water-in-polymer emulsion is inverted to a polymer-in-water emulsion by adding water or an aqueous solution of an emulsifying agent. See, for example, Canadian Patent No. 876,153 and U.S. Pat. Nos. 2,872,427 and 3,867,321. These processes also present difficult mixing problems and accordingly also suffer from such deficiencies as poor particle size control, long agitation periods, high temperatures, use of expensive solvents and large energy input. In addition, such processes are generally practiced in a batchwise manner usually involving considerable loss of polymer due to equipment cleanup at the end of each run or due to unsuccessful runs.

In view of the aforementioned deficiencies of the prior art methods, it would be highly desirable to provide an improved process which can be easily operated in a continuous and efficient (as to energy usage and as to raw material losses) manner to provide aqueous dispersions of polymers having controlled, uniform particle size.

SUMMARY OF THE INVENTION

In one aspect, the instant invention is such an improved process. This process is a continuous process for preparing aqueous polymer microsuspensions having narrow particle size distributions. The process comprises the steps of: (a) forming a heterogeneous composition having a discontinuous aqueous phase and a continuous polymer phase by subjecting substantially all of a composition comprising a heat plastified polymer, water and an emulsifying agent to essentially the same maximum shear under conditions of laminar flow, and (b) converting the resulting polymer-continuous heterogeneous composition to an aqueous-phase-continuous heterogeneous composition having a discontinuous polymer phase.

As used herein the term "heterogeneous composition" refers to aqueous phase/polymer phase systems (i.e., polymer-continuous or water-continuous) wherein the polymer is in the form of a viscous fluid (e.g., in a heat plastified state). The term "aqueous polymer microsuspension" as used herein refers to polymer particles dispersed in an aqueous phase continuum wherein the polymer is in the solid state as contrasted to the heat plastified or viscous liquid state. Such "aqueous polymer microsuspensions" are sometimes herein referred to as aqueous polymer dispersions.

By "subjecting substantially all of the composition comprising a heat plastified polymer, water and an emulsifying agent to essentially the same maximum shear," it is meant that at least about 70 percent, preferably at least about 80 percent, most preferably at least about 90 percent of such composition is subjected to essentially the same maximum shear. By "essentially the same maximum shear" it is meant that the maximum shear imparted to a given increment of the treated composition differs by less than about 15 percent, preferably by less than about 10 percent, most preferably by less than about 5 percent, from the average of the maximum shear imparted to such composition.

The process of the invention is particularly well suited for forming aqueous microsuspensions of heat and/or work sensitive polymers and for use with heat and/or work sensitive emulsifying agents. The process is also particularly well suited for preparing controlled particle size microsuspensions having volume averaged particle diameters of from about 0.1 to about 50 (especially from about 0.5 to about 25) microns and having D84/D50 particle size distributions of from about 1.1 to about 1.8, preferably from about 1.1 to about 1.6.

As used herein, the D84/D50 particle size distribution refers to the ratio of (a) the diameter (i.e., D84) which is greater than that of 84 percent by volume of the polymer particles in the microsuspension to (b) the diameter (i.e., D50) which is greater than that of 50 percent by volume of the particles in the microsuspension.

The aqueous polymer microsuspensions prepared pursuant to such process are useful in a variety of commercial applications. Such applications include use in the preparation of protective and/or decorative coatings (e.g., paints, polishes, etc.), paper coating compositions, adhesives, sizing compositions, carpet backings, electrical circuit board laminates, and the like.

Aqueous polymer microsuspensions prepared pursuant to the process of the invention can also be dewatered to produce small spherical particles of the corresponding polymer. Thus, in another aspect this invention is a process for the preparation of finely divided thermoplastic polymer powders. Such powders are suitable for various applications including use in fluidized bed coating processes, and in electrostatic coating and copying processes, as plastic pigments in paper coating, and the like.

BRIEF DESCRIPTION OF THE DRAWINGS

FIGS. 1 and 2 are side elevation views, partly in section, of exemplary apparatus advantageously used in the aforementioned process. Apparatus corresponding to such drawings are employed in the hereinafter presented working examples and detailed descriptions of such drawings are presented therewith.

DETAILED DESCRIPTION OF THE INVENTION

Polymers suitably microsuspended or dispersed by the process of the invention include any normally solid (e.g., melting above about 20° C., preferably between about 50° and about 200° C., and especially between about 80° and about 200° C.) thermoplastic resin whose degradation point is at a somewhat higher temperature than its melting point. The process of the invention is particularly useful for dispersing polymers having a melt flow rate of less than about 40, preferably less than about 25 decigrams/minute (as determined by ASTM test method D-1238-65T, Procedure A, at Standard Test Condition A) and for dispersing temperature sensitive polymers such as chlorinated polyethylene.

The polymers which can be dispersed by the process of the invention include, for example, polyolefins; diene rubbers such as polybutadiene-1,3 and copolymers of 1,3-butadiene with copolymerizable monomers such as styrene, acrylonitrile, etc.; vinyl resins; olefin-vinyl copolymers; polyamides; epoxy resins; homopolymers and copolymers of monovinylidene aromatic monomers; acrylic resins; polyesters; polycarbonates; polyurethanes, etc.; especially the epoxy resins.

Polyolefins suitable for dispersion by the process of the invention include, for example, normally solid homopolymers and copolymers of olefinically unsaturated (especially mono-alpha-olefinically unsaturated) aliphatic hydrocarbons containing from 2 to about 10 carbon atoms such as ethylene, propylene, n-butylene, isobutylene, the pentenes, the hexenes, etc. Preferred polyolefins are polyethylene and polypropylene. Halogenated counterparts of the aforementioned polyolefins such as chlorinated polyethylene are also suitably employed.

Suitable vinyl resins include, for example, polyvinyl chloride, polyvinyl acetate, vinyl chloride-vinyl acetate copolymers, polyvinyl acetal, and the like (especially polyvinyl chloride). Suitable olefin-vinyl copolymers include ethylene-vinyl acetate, ethylene-vinyl propionate, ethylene-vinyl isobutyrate, propylene-methyl acrylate, ethylene-ethyl acrylate, n-butylene-methyl methacrylate, ethylene-ethylmethacrylate, ethylene-acrylic acid, ethylene-vinyl alcohol, and the like.

Suitable polyamides include those polyamides well known in the art and commonly referred to as nylons.

Suitable epoxy resins include those prepared by intermolecular condensation of an epoxide (e.g., an epihalohydrin) with a polyhydric compound such as bisphenol A, resorcinol, hydroquinone, various glycols (e.g., ethylene glycol, propylene glycol, etc.), glycerol, and the like. Preferred epoxy resins are those prepared from epichlorohydrin and a polyhydric compound, especially bisphenol A.

Suitable homopolymers and copolymers of monovinylidene aromatic monomers include homopolymers and copolymers of such monomers as styrene, vinyl naphthalene, vinyl toluene, p-ethylstyrene, dimethylstyrenes, p-butylstyrene, p-tert-butylstyrene, trimethyl styrenes, p-bromostyrene, p-fluorostyrene, o-, m-, or p-chlorostyrene, dichlorostyrenes, α-methylstyrene, etc. Also suitable are copolymers of such monovinylidene aromatic monomers with other monomers such as conjugated dienes (e.g., 1,3-butadiene, 1,3-pentadiene, 2-methyl-1,3-butadiene, etc.); monoethylenically unsaturated carboxylic acids such as acrylic acid, methacrylic acid, fumaric acid, itaconic acid; acrylic monomers such as methyl methacrylate, ethyl methacrylate, propyl methacrylate, methyl acrylate, propyl acrylate, α-hydroxyethyl acrylate, 2-ethylhexyl acrylate, acrylonitrile, acrylamide, and similar monomers which are copolymerizable with such monovinylidene aromatic monomers.

Acrylic resins suitable for use in the process of the invention include poly(methyl methacrylate), poly(ethyl methacrylate), poly(2-chloroethyl methacrylate), poly(propyl methacrylate), poly(methyl acrylate), polyacrylonitrile, and the like.

Polyesters suitable for use in the process of the invention include poly(ethylene isophthalate), poly(hexamethylene terephthalate), poly(decamethylene terephthalate), poly(ethylene naphthalates), etc.

Polycarbonates which can be dispersed by the process of the invention include poly(4,4'-isopropylidenediphenylene)carbonate (often called the polycarbonate of bisphenol-A), poly(4,4'-ethylidenediphenylene carbonate), poly(4,4'-butylidenediphenylene carbonate), poly(4,4'-isobutylidenediphenylene carbonate), poly[4,4'-isopropylidene-bis(3,5-dichlorophenylene)carbonate] and the like.

Suitable polyurethane resins include those prepared from reaction of a diisocyanate with a polyhydric compound. Examples of suitable diisocyanates include hexamethylene diisocyanate, 2,4-toluenediisocyanate, 4,4-benzidenediisocyanate, 1,5-naphthylenediisocyanate, and the like. Suitable polyhydric compounds include (a) glycols, glycerol, and the like such as ethylene glycol, propylene glycols, 1,4-butylene glycol, etc. and (b) low molecular weight (e.g., 1000–2000) polymers having hydroxyl end groups.

In the initial step of the process of the invention, substantially all of a composition comprising water, an emulsifying agent and heat plastified polymer is subjected to essentially the same maximum shear. By "heat plastified," it is meant that the temperature of the polymer is equal to or above its melting point (i.e., the temperature at which the resin undergoes a phase change from a solid to a flowable viscous liquid) but below its degradation point. In the practice of the invention, it is preferable that the temperature of the resin be somewhat in excess of its melting point. Thus, for example, the heat plastified resin is advantageously employed in the initial step of the process at a temperature which is at least about 20° C., especially at least about 40° C., above its melting point. It is also preferable in the practice of the initial step of the process that the heat plastified polymer exhibit a melt viscosity of from about 200 to about 100,000 centipoises (cps) at the processing temperature employed, as determined using a Brookfield viscometer under standard operating conditions at such temperature. Thus, in the case of polymers having melt viscosities above about 100,000 cps at the desired processing temperature, it is generally advantageous to employ an amount of a conventional plasticizer or diluent for such polymer sufficient to achieve a melt viscosity within the aforementioned preferred range.

It is not necessary in the practice of the invention that the polymer to be dispersed be pure polymer. Thus, for example, the heat plastified polymer can contain conventional additives such as pigments (e.g., carbon black, etc.), dyes, fillers, stabilizers, fire retardants, emulsifying agents as exemplified hereinafter and the like. The amount of such additives can vary depending upon the specific polymer, the specific additive and the specific end use envisioned. However, as a general rule, such additives are individually employed in amounts ranging from about 0.1 to about 20 weight percent based upon the polymer weight.

Emulsifying agents suitable for use in the initial step of the process of the invention include conventional anionic, cationic and non-ionic emulsifiers and any practical combinations thereof. An extensive listing of such emulsifying agents can be found in *McCutcheon's Detergents and Emulsifiers,* NORTH AMERICAN EDITION, 1973. The emulsifying agent employed in forming the polymer-continuous heterogeneous composition in the initial process step generally performs three functions in the practice of the invention. Specifically, the emulsifying agent (a) helps match the viscosity of the aqueous and polymer phases in the initial process step, thereby facilitating energy-efficient mixing of such phases; (b) reduces the interfacial tension thereby also reducing the mixing energy required in the initial process step and (c) helps stabilize the final aqueous polymer microsuspension. Selection of a suitable emulsifying agent for performing such functions for a particular polymer in the practice of the invention is made pursuant to conventional considerations such as compatibility (e.g., interfacial tension), ability to impart stability to the finished microsuspension, etc.

The amount of emulsifying agent used in the initial step of the process of this invention (a) suitably is an amount sufficient to permit the formation of the polymer-continuous heterogeneous composition and (b) advantageously is an amount sufficient to stabilize the finished aqueous polymer microsuspension. Preferably, the type and amount of emulsifying agent employed to form the polymer-continuous composition in the initial process step is such that the surface tension of aqueous and polymer phases in the polymer-continuous heterogeneous composition at the desired operating temperature is less than about 20 dynes/centimeter; preferably less than about 10 dynes per centimeter, most preferably less than about 5 dynes per centimeter. While the amount which is suitable for performing the above functions varies somewhat from one emulsifier-polymer system to the next, generally from about 0.5 to about 20, preferably from about 0.5 to about 5, parts by weight of emulsifying agent is suitably employed per 100 parts by weight of heat plastified polymer.

The emulsifying agent employed can be of the monomeric type or of the polymeric type or combinations of such types can be employed. However, the preferred emulsifying agents for use in the practice of this invention are water soluble polymeric (natural and synthetic) emulsifying agents which serve both as emulsifying agents and as water thickeners. Such emulsifying agents are also often referred to as protective colloids.

Examples of such water soluble polymeric emulsifying agents include polyvinyl alcohol (preferably having a molecular weight of at least about 50,000, especially of at least about 100,000); partially hydrolyzed (e.g., from about 85 to about 99 percent hydrolyzed) polyvinyl acetate (preferably having a molecular weight of at least about 50,000, especially of at least about 100,000); block copolymers of ethylene oxide and propylene oxide (such as those of the "Pluronic" trade name series and marketed by BASF Wyandotte, Industrial Chemical Division); natural products such as gum arabic, gum tragacanth, starches, etc.; cellulose derivatives such as hydroxyethyl cellulose, hydroxypropyl cellulose, sodium carboxymethyl cellulose, methyl cellulose, etc.; the polymer of methyl vinyl ether; polyvinyl pyrrolidone; vinyl type copolymers of monomeric acids such as acrylic acid, methacrylic acid, maleic anhydride, crotonic acid with copolymerizable monomers such as vinyl acetate, styrene, ethylene, propylene, etc.; and the like.

The use of such water soluble polymeric emulsifying agents is particularly advantageous in that thickening of the aqueous phase has been observed to facilitate obtention of small particle size polymer microsuspensions at reduced energy inputs. Naturally similarly advantageous results can be obtained by employing an optional water thickener (which is not an emulsifier) in addition to the emulsifier (which may or may not also be a water thickener).

When a water soluble polymeric emulsifying agent is employed (or when a combination of an optional water thickener and emulsifying agent is employed), the amount of the thickening component employed is preferably sufficient to provide the aqueous phase of the polymer-continuous heterogeneous composition with a viscosity which is from about 0.01 to about 100 percent, more preferably from about 1 to about 100 percent, most preferably from about 10 to about 100 percent, of that of the heat plastified polymer; both viscosities being that exhibited at the temperature employed for the initial step of the process of the invention.

The amount of water employed to form the polymer-continuous heterogeneous composition can also vary so long as the amount is at least sufficient to form such polymer-continuous composition but less than that "critical amount" required to form an aqueous-phase-continuous heterogeneous composition. Such "critical amount" is the water content at which the polymer-continuous composition is converted to an aqueous-phase-continuous composition. The water content constituting the "critical amount" varies depending upon specific ingredients employed. However, generally the "critical amount" is between about 30 and about 100 parts by volume water per 100 parts by volume of polymer. In practice, determination of whether a composition is polymer continuous or aqueous phase continuous is by conventional techniques such as by measuring the electrical conductivity of such composition.

Preferably in the initial step of the process the amount of water employed comprises from about 25 to about 99, more preferably from about 50 to about 99 percent, most preferably from about 80 to about 99 percent, of the aforementioned "critical amount." Thus, as a general rule the initial increment of water comprises preferably from about 7.5 to about 99, more preferably from about 15 to about 99, most preferably from about 24 to about 99, parts by volume of water per 100 parts by volume of the heat plastified polymer.

The order of combining the aforementioned ingredients for the polymer-continuous heterogeneous composition can vary. However, it is generally advantageous (especially when a water soluble, polymeric emulsifying agent is employed) to first premix the emulsifying agent with the water and then to combine the resulting mixture with the heat plastified polymer.

The means employed to heat plastify the polymer for use in the initial step of the process is not critical. Any convenient conventional means can be employed for converting previously prepared solid bulk resin (e.g., flakes, granules or powders) to the heat plastified or molten form. Alternatively, the resin can be dispersed directly from an upstream polymerization process from which it exits in molten form. In this latter instance, unreacted monomer retained in the polymer can serve as a plasticizer. Such monomer can subsequently be readily removed from the aqueous polymer emulsion or dispersion in any convenient, conventional manner.

After the polymer is heat plastified, a heterogeneous composition is formed which has a discontinuous aqueous phase and a continuous polymer phase and which is herein also called a polymer-continuous composition. Such heterogeneous composition is formed by subjecting substantially all of a composition comprising the aforementioned heat plastified polymer, water and an emulsifying agent to essentially the same maximum shear under conditions of laminar flow as defined in *Perry's Chemical Engineer's Handbook*, Fourth Edition at page 5–16.

The magnitude of the aforementioned maximum shear is not particularly critical. However, it has been surprisingly found that the magnitude of the maximum shear employed in the initial step of the process, i.e., the step of forming the polymer-continuous composition, generally determines the average size of the dispersed polymer particles in the final aqueous polymer microsuspension product. Thus the magnitude of maximum shear employed to form the polymer-continuous heterogeneous composition varies depending upon the particular ingredients and operating conditions (e.g., temperature) employed and upon the average polymer particle size desired for the aqueous polymer microsuspension. However, as a general rule, a maximum shear rate of between about 25 and about 5,000, preferably between about 25 and about 2,000, most preferably between about 100 and about 1,000, reciprocal sounds is advantageously employed in such initial process step.

The length of time over which the aforementioned maximum shear is applied in the initial process step is also not particularly critical so long as it is sufficient to provide the desired narrow particle size distribution (e.g., a maximum D84/D50 of about 1.8, preferably a maximum D84/D50 of about 1.6) for the dispersed polymer particles in the final aqueous polymer microsuspension. However, such length of time is preferably sufficient to enable the aqueous and polymer phases to reach a steady state relationship in the initial process step such that increased duration of exposure to the aforementioned maximum shear results in no substantial further reduction in the volume averaged particle size or in the D84/D50 particle size distribution of the dispersed polymer particles of the final aqueous polymer microsuspension. The time required in a given instance to achieve the aforementioned desired particle distribution and to achieve the preferred steady state relationship will vary depending upon the particular water/polymer/emulsifying agent composition, the equipment, and the processing conditions employed. Generally, however, the desired particle size distribution and the preferred steady state relationship is achieved by exposure to the aforementioned maximum shear for between about 1 second and about 5 minutes. In many cases, as little as from about 1 second to about 60 seconds is sufficient for both purposes.

The degree of uniformity of the maximum shear to which substantially all of the heat plastified polymer/water/emulsifying agent composition is subjected significantly affects the degree of uniformity of particle size (i.e., the breadth of the particle size distribution) for the final aqueous polymer microsuspension. Accordingly it is desirable that each increment of such composition be subjected to essentially the same magnitude of maximum shear. Naturally, however, creation of conditions in which precisely the same maximum shear is imparted to each increment of such composition is an ideality not generally achievable in reality. Thus, by the usage of "essentially the same," provision is made for typical minor internal variation (e.g., variation of from about 2 to about 15, preferably from about 2 to about 10, percent) in the maximum shear imparted to a given increment of such composition as compared to the average of the maximum shear imparted to such composition. Such internal variations typically result, for example, from non-linearity in the velocity profile of (and corresponding non-uniformity in the shear rate imparted to) the composition as the maximum shear is created under laminar flow conditions. Such non-linearity of velocity profile can result, for example, from a parabolic velocity distribution across the composition flow path or from edge or wall effects of boundaries defining such flow path in typical mixing apparatus, such as those described hereinafter.

Typically, the aforementioned requisite processing conditions for the initial step of the microsuspension process are created by directing the composition comprising, in admixture, heat plastified polymer, water and emulsifying agent through the same (or a geometrically equivalent) maximum shear region (e.g., an annulus, gap, perforation, channel, aperture, etc.) of a mixing apparatus under essentially the same laminar flow conditions (e.g., temperature, flow rate, etc.). Under such circumstances, essentially the same maximum shear stress is exerted upon each increment of admixed polymer, water and emulsifying agent since each increment will have essentially the same viscosity and will be acted upon by essentially the same maximum magnitude of shear.

As used above, "geometrically equivalent" means that the planar cross sections of all alternative flow paths in the maximum shear region have substantially the same shape and substantially the same dimensions.

In the aforementioned maximum shear region, shear is imparted to the admixed polymer, water and emulsifying agent by a velocity gradient across the flow path of such admixed polymer, water and emulsifying agent as the mixture passes through such region under conditions of laminar flow. Such velocity gradient can be, for example, a result of the polymer/water/emulsifier mass flowing through (a) an apparatus having stationary shear-inducing elements (e.g., a static mixer) or (b) an apparatus having two or more shear-inducing elements, at least one of which moves relative to the other (e.g., a rotor and housing apparatus such as those described in U.S. Pat. Nos. 3,127,152; 3,130,959; 3,131,910 and 3,716,965). Formation of the polymer-continuous heterogeneous composition in the aforementioned manner is to be distinguished from processes wherein a heterogeneous composition is formed under mixing conditions which produce turbulent flow.

From the foregoing it is apparent that formation of the polymer-continuous heterogeneous composition can be accomplished in a wide variety of apparatus. For example, conventional static devices (i.e., having stationary elements), e.g., static mixers, packed tubes, scraped surface heat exchangers, and conventional dynamic devices (i.e., having at least one moving element), e.g., extruders and the aforementioned rotor/housing devices, can be employed to provide the requisite processing conditions in the initial process step. However, the dynamic devices are preferred since, in such devices, the rate of shear can be conveniently controlled independent from the flow rate of the admixed composition whereas with static devices the magnitude of the shear generated is necessarily coupled to the flow rate through such devices.

The aforementioned preferred type of apparatus (i.e., dynamic devices) can be generally described as comprising (a) an outer element (e.g., a housing) and an inner element (e.g., a rotor) at least one of which elements is rotatable relative to the other and (b) a drive means (preferably a variable speed drive means) for imparting relative rotational motion between the inner element and the outer element. The inner and outer elements of such apparatus define (i.e., by the inner surface of the outer element and the outer surface of the inner element in the maximum shear region) a restrictive flow path in which the maximum shear is created. Preferably, in the maximum shear region, the outside diameter of the inner element of such preferred apparatus is at least about 75 percent, more preferably at least about 80 percent, most preferably at least about 85 percent, of the inside diameter of the outer element of such preferred apparatus. Within such diameter ratio, the width of the flow path in the maximum shear region in terms of actual distances can vary. However, in most instances such width is between about 0.05 inch and about 1 inch, preferably between about 0.05 inch and about 0.5 inch, most preferably between about 0.05 inch and about 0.25 inch. The type of flow conditions created by the aforementioned dynamic devices can be characterized as "couette flow" as defined by V. L. Streeter in *The Handbook of Fluid Dynamics*, First Edition (1961), at Section 5, page 2. Such "couette flow" can be of the planar or cylindrical type depending upon the particular geometry of the apparatus employed.

In the aforementioned dynamic devices, the geometrical shape of the inner surface of the outer element and the outer surface of the inner element can vary. Thus, for example, the shape of the inner surface of the outer element and the outer surface of the inner element can be the same or different. Such surfaces can independently be, for example, disc-like, cylindrical, spherical, hemispherical, ellipsoidal (i.e., egg-shaped), conical, etc. In fact, the three-dimensional geometrical shape resulting from rotation of any two-dimensional (i.e., planar) figure (or shape) a full revolution around an axis can be employed. However, apparatus wherein the inner surface of the outer element is cylindrical in shape is generally more economical and convenient to build, operate and maintain. Accordingly, use of such apparatus is preferred in forming the polymer-continuous heterogeneous composition in the practice of the invention. In such preferred type of apparatus the shape of the inner element can still vary and any geometrical inner element shape of suitable dimensions to rotatably fit within the cylindrical outer element and to create the desired uniformity, magnitude and duration of maximum shear can be employed. However, an apparatus of particular interest for use in the aforementioned initial step of the process is one wherein, in the maximum shear region, the outer element is a cylindrical housing and the inner element is a cylinder rotatably mounted within the housing. Examples of such an apparatus are depicted in FIGS. 1 and 2. Another apparatus which is particularly advantageous is one wherein (a) the housing inner surface is cylindrical (i.e., having a constant diameter along its axis) and (b) the rotor has an increasing diameter along its axis in the direction of water, polymer and emulsifying agent flow (e.g., the rotor outer surface is in the shape of a cone or a truncated cone).

After the polymer-continuous composition has been formed as hereinbefore described, it is converted to an aqueous-phase-continuous composition having a discontinuous polymer phase by adding to such polymer-continuous composition an additional amount (i.e., an additional increment) of water. Optionally such additional increment of water can contain a small amount of a suitable emulsifying agent and/or water thickener such as those hereinbefore described. The amount of water added is not critical so long as it is at least sufficient to convert the polymer-continuous composition to a polymer-discontinuous composition having a continuous aqueous phase. For example, such additional increment of water can be sufficiently large to raise the water content of the resulting aqueous-phase-continuous composition to the content desired for the final aqueous polymer microsuspension. Preferably, however, the amount of the additional increment of water is such that the water content of the resulting aqueous-phase-continuous composition is less than about 120, more preferably less than about 110 percent, of the hereinbefore defined "critical amount." Most preferably the amount of the additional increment of water is just sufficient to convert the polymer-continuous composition to an aqueous-phase-continuous composition.

The manner in which the additional water increment is combined with the polymer-continuous heterogeneous composition to convert it to an aqueous-phase-continuous (i.e., a polymer discontinuous) composition is not critical. Preferably, however, the additional water is added to such polymer continuous composition while such composition is being subjected to the aforementioned maximum shear. Accordingly, such conversion step is preferably performed in the maximum shear region of the apparatus employed in the initial step of the process.

After the polymer continuous composition has been converted to the aqueous phase continuous composition, it can optionally be diluted to the water content desired for the aqueous polymer microsuspension (typically from about 30 to about 70 weight percent polymer solids on a total weight basis for most applications) in any convenient manner either before or after an optionally employed cooling step. However, it is often advantageous to dilute the aqueous phase continuous composition before it is cooled. In addition, it is generally advantageous to employ sufficient agitation to promote intimate mixing in the optional dilution step.

In the case of very concentrated aqueous phase continuous compositions (e.g., containing from about 60 to about 80 weight percent polymer on a total weight basis), dilution is preferably accomplished in a stagewise manner. Such stagewise dilution is advantageous in that the more closely matching viscosities of the diluting stream and the heterogeneous composition being diluted reduces the mixing energy required for dilution. Typically such stagewise dilution is accomplished by employing (a) an initial dilution stream of diluted microsuspension product (such as by recycling from about 10 to about 40 percent of the final product) and (b) one or more subsequent dilution streams primarily composed of water.

After the aqueous-phase-continuous heterogeneous composition has been formed (and optionally diluted) it can be cooled or allowed to cool to below the melting point of the polymer (e.g., to ambient temperature) to form the aforementioned aqueous polymer microsuspension. The resulting microsuspension comprises finely divided polymer particles dispersed in a continuous aqueous phase. Generally such dispersed particles have a volume averaged particle size of from about 0.1 to about 50 (especially from about 0.5 to about 2.5 microns) and a D84/D50 particle size distribution of from about 1.1 to about 1.8 (especially from about 1.1 to about 1.6).

From the foregoing, it is apparent that the present invention provides a continuous process for preparing aqueous polymer microsuspensions and that, in its broad embodiment, such process comprises the critical steps of (a) forming a polymer-continuous heterogeneous composition having a discontinuous aqueous phase and (b) converting the resulting polymer-continuous heterogeneous composition to a polymer-discontinuous heterogeneous composition having a continuous aqueous phase. It is also apparent that in narrower embodiments the process of the invention can also include one or both of two additional, optional steps, namely (a) dilution of the polymer-discontinuous composition to increase the relative proportion of its continuous aqueous phase and (b) cooling the polymer-discontinuous composition to solidify the discontinuous polymer phase (i.e., to solidify the dispersed particles of polymer melt). In a particularly preferred embodiment of the invention all four of such steps are employed. Thus, such preferred embodiment is a continuous microsuspension process which comprises in combination and in the following sequence the hereinbefore described steps of (a) forming a polymer-continuous heterogeneous composition having a discontinuous aqueous phase; (b) converting the resulting polymer-continuous heterogeneous composition to a concentrated (e.g., containing between about 30 and about 80 parts by volume of aqueous phase per 100 parts by volume polymer phase) polymer-discontinuous (i.e., aqueous-phase-continuous) heterogeneous composition; (c) diluting the resulting polymer-discontinuous heterogeneous composition to the desired aqueous phase content (e.g., containing between about 45 and about 250 parts by volume of aqueous phase per 100 parts by volume of polymer phase) and (d) cooling the resulting diluted polymer-discontinuous composition (e.g., to ambient temperature) to solidify the discontinuous polymer phase (i.e., to solidify the dispersed particles of polymer melt).

Following formation of the aqueous polymer microsuspension (e.g., following the optional cooling step) the polymer solids content of the microsuspension can be adjusted (e.g., water added or removed) if desired. In addition, conventional additives (e.g., surfactants, bacteriocides such as formaldehyde, antifoamers, etc.) can be added to the microsuspension in any convenient, conventional manner.

The resulting aqueous polymer microsuspension can be employed in a conventional manner in the preparation of protective and/or decorative coatings, paper coatings, adhesives, sizing compositions, carpet backings, electrical circuit board backings, and the like. In addition, finely divided polymer powder can be obtained from the aqueous polymer microsuspension by dewatering such microsuspension in a conventional manner (e.g., by filtration, centrifugation, evaporation, spray drying, etc.). Such powders can be employed in a conventional manner in fluidized bed coating processes, electrostatic coating or printing processes, as plastic pigments in paper coatings, etc.

To further illustrate, without intending to limit the process of the invention, the following examples are presented.

In the following examples, continuous variable shear mixers are employed which are schematically represented in FIGS. 1 and 2. Such mixers each comprise (1) a tubular housing (2 in FIG. 1 and 2a in FIG. 2), (2) an 18-inch long rotor of the indicated configuration (4 in FIG. 1 and 22 in FIG. 2) rotatably and concentrically mounted in the housing, and (3) a variable speed motor (not shown) coupled to the rotor by a drive shaft (5 in FIG. 1 and 5a in FIG. 2).

Each housing (2 or 2a) has an inside diameter of 1.5 inches and is equipped with (a) 5 electrical band heaters (not shown), (b) 5 injection ports (6, 8, 10, 12 and 14 in FIG. 1 and 6a, 8a, 10a, 12a and 14a in FIG. 2), (c) a polymer inlet (16 and 16a in FIGS. 1 and 2, respectively), (d) a dispersion or product outlet (18 and 18a in FIGS. 1 and 2, respectively), (e) thermocouples (not shown), and (f) conductivity probes (not shown) to determine whether the polymer phase or the water phase is continuous. In the mixers of FIGS. 1 and 2, thermocouples and conductivity probes are located at axial positions corresponding to injection ports 6, 8 and 10 in FIG. 1 and 6a, 8a and 10a in FIG. 2.

The injection ports are located as follows along the length of the housing:

| Port Identification | | Location |
| --- | --- | --- |
| Figure 1 | Figure 2 | (Distance from Inlet End) |
| 6 inch | 6a | about ½ |
| 8 | 8a | about 4 inches |
| 10 | 10a | about 7-¼ inches |
| 12 | 12a | about 10-¾ inches |
| 14* | 14a* | about 14 inches |

*The last injection port (14 and 14a) is capped and not employed in the following examples.

The rotor 4 of FIG. 1 has a uniform outside diameter of 1.25 inches along its length except for five, 0.5 inch wide grooves 20 which each have a depth of 0.125 inch.

The rotor 22 of FIG. 2 has three laminar mixing sections 24 which have an outside diameter of 1.25 inches. The rotor 22 also has two groove sections 21 which have a 0.75 inch outside diameter and which correspond in axial location to the injection ports 8a and 14a of the housing 2a.

The rotor 22 is also provided with two complex mixing sections 26, the first being located between injection ports 10a and 12a and the second being located between injection ports 12a and 14a. Each complex mixing section 26 has a splined mixing section 27 having eight splines 30 protruding radially outward from a ¾ inch outside diameter rotor section 32. Each complex mixing section 26 also has a short laminar mixing section 34 which has a 1.25 inch outer diameter and which follows the splined mixing section 27 as indicated in FIG. 2.

In each splined mixing section 27 of the rotor 22 the splines 30 are cylindrical in shape, have a diameter of 3/16 inch and protrude ¼ inch from the surface of the ⅞ inch O.D. rotor section 32 to which they are attached. The eight splines 30 in each splined mixing section 27 are positioned in two groups of four, the splines of each group being circumferentially spaced at 90° intervals around the rotor section 32 and the two groups are separated from each other axially by ⅜ of an inch.

The housing 2a of FIG. 2 also has two splined housing sections 28 corresponding in location to the splined mixing sections 27. The housing-based splines 38 are cylindrical in shape, have a 3/16 inch diameter and protrude radially inward ¼ inch from the inner housing surface. There are eight housing-based splines in each splined housing section 28 and they are positioned in two groups of four. The splines of each group are circumferentially spaced at 90° intervals around the housing inner surface. The first group of housing-based splines 38 in each splined housing section 28 is located between the two groups of rotor-based splines 30 as indicated in FIG. 2. The second group of housing-based splines 38 in each splined housing section 28 is positioned between the second group of rotor-based splines and the 1.25 inch diameter laminar mixing section 34 as indicated in FIG. 2.

The apparatus of FIG. 1 is employed for Examples 1 through 8. The apparatus of FIG. 2 is employed for the remaining examples (i.e., 9 through 11).

EXAMPLE 1

Apparatus

A pot equipped with electrical band heaters for melting solid polymer is connected to the polymer inlet of the continuous variable shear mixer of FIG. 1 via a gear pump.

A supply of an aqueous solution of emulsifying agent is connected to injection ports 6 and 8 of the mixer via two separate gear pumps.

A recycle line is connected to injection port 10 from the mixer outlet 18.

Injection port 12 is provided with a water supply line.

Procedure

The continuous variable shear mixer is preheated to a temperature of about 80° C. by energizing the electrical band heaters on the housing.

An aqueous emulsifying agent solution is prepared containing 16.7 weight percent on a total weight basis of polyvinyl alcohol (Vinol 523, a product of Airco Chemical Products) having a molecular weight of about 120,000 and being about 88 percent hydrolyzed. A 5000 gram portion of solid flakes of a bisphenol A based epoxy resin having a softening point of about 72° C. and an epoxy equivalent weight (EEW) of about 475–575 is heated to a flowable viscosity (i.e., to a temperature of about 90° C.) in the heated polymer melting pot. The resulting polymer melt is fed at a flow rate of 24.4 grams per minute to the preheated continuous variable shear mixer of FIG. 1 which is operated at 1055 revolutions per minute (i.e., a maximum shear rate of about 550 reciprocal seconds). The first aqueous emulsifying agent stream (S-1) is fed (at about 25° C.) at about 7.4 grams per minute into injection port 6. The second aqueous emulsifying stream (S-2) is fed into injection port 8 at about 1.4 grams per minute at a temperature of about 25° C.

The recycle stream is fed into injection port 10 at about 30 grams per minute and at about 85° C.

The water dilution stream at injection port 12 is fed at about 21.2 grams per minute and at a temperature of about 25° C.

Results

A polymer-continuous heterogeneous composition is formed in the region of maximum shear stress (i.e., between injection ports 6 and 8). The aqueous phase of such composition becomes continuous (having a discontinuous polymer phase) between injection ports 8 and 10 as indicated by the conductivity probe at injection port 10.

The temperature at conversion from polymer-continuous to polymer-discontinuous is about 102° C. and the polymer content at conversion is about 78 weight percent on a total weight basis.

The polymer content of the converted aqueous phase continuous composition downstream of the recycle injection (but before injection port 12) is about 67 weight percent on a total weight basis.

The polymer content of the final aqueous polymer microsuspension (i.e., after dilution at injection port 12) is 55 weight percent on a total weight basis and the polyvinyl alcohol (PVA) content is 5.7 weight percent based upon the polymer solids. The volume average particle diameter of the dispersed solid polymer particles after cooling (as determined using a Coulter counter) is about 0.55 micron.

The particle size distribution is determined as the ratio of the diameter which is greater than that of 84 percent by volume of the particles (i.e., D84) to the diameter which is greater than that of 50 percent by volume of the particles (i.e., D50). This ratio is referred to hereinafter as D84/D50. In this example, the D84/D50 is 1.48.

EXAMPLES 2–7

Several runs are practiced using the procedure of Example 1 and the conditions indicated in Table I. The results of these runs (as well as the results of Example 1) in terms of average particle size and the particle size distribution (D84/D50) of the resulting polymer dispersions are set forth in Table I.

TABLE I

| | CONDITIONS AND RESULTS | | | | | | |
|---|---|---|---|---|---|---|---|
| | Example Number | | | | | | |
| Conditions | 1 | 2 | 3 | 4 | 5 | 6 | 7 |
| Mixer RPM | 1055 | 1055 | 1055 | 1055 | 770 | 525 | 58 |
| Maximum Shear Rate (sec.$^{-1}$) | 550 | 550 | 550 | 550 | 403 | 275 | 30 |
| Polymer Flow Rate (gms/min) | 24.4 | 21.1 | 25.0 | 22.7 | 24.4 | 24.4 | 21.1 |
| PVA Conc. In S-1 and S-2 | 16.7 | 14.1 | 11.5 | 10.0 | 16.7 | 16.7 | 14.1 |
| S-1 Flow (gms/min) | 7.4 | 5.1 | 6.1 | 6.0 | 7.4 | 7.4 | 5.1 |
| S-2 Flow (gms/min) | 1.4 | 1.4 | 1.5 | 1.5 | 1.4 | 1.4 | 1.4 |
| Temp. at Conversion (° C) | 102 | 101 | 94 | 91 | 96 | 93 | 76 |
| Viscosity Ratio at Conversion Temperature | | | | | | | |

TABLE I-continued

CONDITIONS AND RESULTS

| Conditions | Example Number | | | | | | |
|---|---|---|---|---|---|---|---|
| | 1 | 2 | 3 | 4 | 5 | 6 | 7 |
| (Aqueous Phase:Polymer Phase) | 0.02 | 0.011 | 0.002 | 0.00075 | 0.013 | 0.0092 | 0.00035 |
| Results | | | | | | | |
| Vol. Avg. Particle Size (microns) | 0.55 | 0.64 | 0.92 | 2.1 | 0.68 | 1.12 | 12.83 |
| Size Distribution D84/D50 | 1.48 | 1.45 | 1.45 | 1.51 | 1.47 | 1.43 | 1.54 |

EXAMPLE 8

Procedure

Example 1 is repeated except that the polymer-in-water microsuspension exits the mixer of FIG. 1 through injection port 10 and is directed from there, along with the recycle stream, into the inlet of a static mixer. The water stream for dilution is injected into the static mixer at about the center of its length and the above-noted recycle stream is taken from the product outlet of the static mixer.

Results

The resulting dispersion is substantially equivalent to that obtained in Example 1.

EXAMPLE 9

Apparatus

A pot equipped with electrical band heaters for melting solid polymer is connected via a gear pump to a 13 element Koch ¾ inch static mixer which is in turn connected to the polymer inlet of the continuous variable shear mixer of FIG. 2.

A supply of an aqueous solution of emulsifying agent is connected to the static mixer inlet and to injection port 8a of the mixer of FIG. 2.

A recycle line is connected to injection port 10a of the mixer of FIG. 2 from the mixer outlet 18a. A water supply line is connected to injection port 12a.

Procedure

The continuous variable shear mixer of FIG. 2 is preheated to a temperature of about 60° C. by energizing the electrical band heaters on the housing.

An aqueous emulsifying agent solution is prepared containing 14.1 weight percent (on a total weight basis) of polyvinyl alcohol having a molecular weight of about 120,000 and being about 88 percent hydrolyzed. A 5,000 gram portion of solid flakes of an epoxy novalac resin having 3.6 epoxy groups per phenoxy group and having an EEW of about 176–181 and a softening point of about 20° C. is heated to a flowable viscosity (i.e., to about 60° C.) in the heated pot. The resulting polymer melt is fed at a flow rate of 21.1 grams per minute to the 13 element Koch ¾ inch static mixer. The first aqueous emulsifying agent stream (S-1) is fed to the inlet side of the static mixer at a rate of 5.1 grams per minute and at a temperature of about 25° C.

From the static mixer, the admixed polymer and emulsifying agent stream is pumped into the inlet of the preheated mixer of FIG. 2 which is operated at 1055 revolutions per minute (i.e., a maximum shear rate of about 550 reciprocal seconds).

The second aqueous emulsifying agent stream, S-2, is fed into injection port 8a at about 1.4 grams per minute and at a temperature of about 25° C.

The recycle stream is fed into injection port 10a at about 30 grams per minute and at about 45° C.

The water dilution stream at injection port 12a is fed at about 21.2 grams per minute and at a temperature of about 25° C.

Results

A coarse dispersion of the aqueous phase in the polymer phase is formed in the static mixer. The aqueous phase is further dispersed in the continuous polymer phase in the maximum shear region of the mixer of FIG. 2 (i.e., between injection ports 6a and 8a).

Conversion of the discontinuous aqueous phase to a continuous aqueous phase occurs between injection ports 8a and 10a.

The temperature at conversion from polymer-continuous to polymer-discontinuous is about 55° C. and the ratio of the viscosity of the emulsifier solution of S-1 to the viscosity of the polymer at the conversion temperature is about $4.4 \times 10^{-1}$.

The volume average particle diameter is about 0.6 micron (after filtering to remove some coagulum which is formed).

The D84/D50 particle size distribution (also after filtering) is 1.20.

EXAMPLE 10

Procedure

Example 9 is repeated using a tetrabrominated bisphenol A based epoxy resin having an EEW of 445–520 and a softening point of 73° C.

The polymer melt is fed to the static mixer at about 45.4 grams per minute and at a temperature of 100° C. The first aqueous PVA stream is fed to the static mixer at about 12 grams per minute and at about 25° C. The second aqueous PVA stream is fed into injection port 8a at 3 grams per minute and at about 25° C. The recycle stream is fed into injection port 10a at about 60 grams per minute and at about 85° C. The water dilution stream at injection port 12a is fed at about 40 grams per minute and at about 25° C.

Results

The temperature at conversion from polymer-continuous to polymer-discontinuous is about 100° C. and the ratio of the viscosity of the S-1 emulsifier solution to the viscosity of the polymer (both being at the conversion temperature) is about $9.8 \times 10^{-3}$.

The volume averaged particle diameter is 0.91 micron and the D84/D50 particle size distribution is 1.36.

EXAMPLE 11

Procedure

Example 10 is repeated using a bisphenol A based epoxy resin having an EEW of 1600–2000 and a softening point of 121° C. The polymer melt is fed to the static mixer at about 45.4 grams per minute and at about 180° C. The temperature of the recycle stream is about 150° C. The flows and temperatures of the remaining streams are as indicated in Example 10.

Results

The temperature at conversion from polymer-continuous to polymer-discontinuous is about 150° C. and the viscosity ratio of the aqueous to polymer phases at that temperature is $6.0 \times 10^{-4}$.

The volume averaged particle diameter is 4.28 microns and the D84/D50 particle size distribution is 1.65.

While the practice of the invention has been illustrated by reference to specific examples, such examples are not to be understood as limiting the scope of the instantly claimed invention.

What is claimed is:

1. A continuous process for preparing aqueous polymer microsuspensions which comprises the steps of:
   (a) forming a heterogeneous composition having a discontinuous aqueous phase and a continuous polymer phase by subjecting substantially all of a composition comprising a heat plastified polymer, water and an emulsifying agent to essentially the same maximum shear under conditions of laminar flow for a time sufficient to provide the dispersed polymer particles in the final aqueous polymer microsuspension with a D84/D50 particle size distribution of 1.8 or less;
   (b) converting the resulting polymer-continuous heterogeneous composition to an aqueous-phase-continuous heterogeneous composition having a discontinuous polymer phase by adding an additional amount of water to such polymer-continuous composition; and
   (c) cooling the aqueous-phase-continuous heterogeneous composition to below the melting point of the polymer.

2. The process of claim 1 further comprising a dilution step to increase the water content of the aqueous polymer microsuspension.

3. The process of claim 2 wherein the dilution step comprises introducing a dilute aqueous polymer microsuspension to the aqueous-phase-continuous heterogeneous composition of step (b).

4. The process of claim 1 wherein the polymer is an epoxy resin.

5. The process of claim 1 wherein the aqueous polymer microsuspension contains from about 30 to about 70 weight percent polymer solids on a total weight basis.

6. A process of claim 1 wherein the emulsifying agent is a water soluble polymeric emulsifying agent.

7. The process of claim 1 wherein the emulsifying agent is polyvinyl alcohol.

8. The process of claim 1 wherein the emulsifying agent and the water of step (a) are introduced together as an aqueous solution.

9. A process for preparing a dry finely divided polymer powder comprising dewatering an aqueous polymer microsuspension prepared pursuant to the process of claim 1.

10. The process of claim 1 wherein the heterogeneous composition of step (a) is formed in a maximum shear region of a dynamic device, which device comprises (1) a cylindrical housing, (2) a cylindrical rotor, rotatably mounted in the housing, and (3) a drive means for rotating the rotor in the housing and wherein the maximum shear region comprises an annular flow path formed by a length of the housing surrounding a coaxially aligned length of the rotor.

11. The process of claim 10 wherein, in the maximum shear region, the ratio of the diameter of the rotor to the diameter of the housing is at least about 0.75.

12. The process of claim 11 wherein the rotor is rotated at a speed sufficient to create a shear rate in the maximum shear region of from about 25 to about 5,000 reciprocal seconds.

13. The process of claim 10 wherein:
   (a) the maximum shear region is an annular flow path which is radially $\frac{1}{8}$ inch wide and axially about 3 inches long and which is formed by about a 3 inch length of the cylindrical rotor having an outside diameter of about 1.25 inches which length of cylindrical rotor is surrounded by a coaxially aligned length of cylindrical housing about 3 inches in length and having an inside diameter of about 1.5 inches;
   (b) the rotor is rotated at about 1055 revolutions per minute thereby creating a shear rate of about 500 reciprocal seconds in the maximum shear region;
   (c) the heat plastified polymer is a bisphenol A based epoxy resin having a softening point of about 72° C., an epoxy equivalent weight of about 475–575;
   (d) the emulsifying agent is polyvinyl alcohol which (1) has a molecular weight of about 120,000, (2) is about 88 percent hydrolyzed, and (3) is premixed with the water for the water-in-polymer emulsion to form an aqueous emulsifier solution containing 16.7 weight percent polyvinyl alcohol on a total weight basis;
   (e) the heat plastified polymer is fed to the maximum shear region at a temperature of about 90° C.; and
   (f) the aqueous emulsifier solution is fed to the maximum shear region at a temperature of about 25° C. and at the rate of about 0.3 part by weight per minute per part by weight per minute of heat plastified polymer feed rate to such maximum shear region.

14. The process of claim 1 wherein: the heterogeneous composition of step (a) is formed by subjecting at least about a 70 percent portion of a composition comprising a heat plastified polymer, water and an emulsifying agent to a maximum shear of from about 25 to about 5,000 reciprocal seconds under conditions of laminar flow wherein said maximum shear is applied to said portion for a period of from about 1 second to about 5 minutes and wherein the magnitude of the maximum shear applied to each increment of said portion differs by less than about 15 percent from the average magnitude of maximum shear applied to said portion.

15. The process of claim 1 wherein the aqueous-phase-continuous heterogeneous composition of step (b) contains between about 30 and about 80 parts by volume of aqueous phase per 100 parts by volume of polymer phase and wherein such process further comprises the steps of (1) diluting the aqueous-phase-continuous heterogeneous composition to an aqueous phase content of between about 45 and about 250 parts by volume of aqueous phase per 100 parts by volume of polymer phase and (2) cooling the diluted aqueous-phase-continuous composition to solidify the discontinuous polymer phase.

16. A continuous process for preparing aqueous polymer microsuspensions which comprises the steps of:
   (a) forming a heterogeneous composition having a discontinuous aqueous phase and a continuous viscous liquid polymer phase by subjecting, (1) at a temperature equal to or above the melting point of the polymer but below the degradation point of the polymer, (2) under conditions of laminar flow and (3) for a time sufficient to provide the dispersed polymer particles of the final aqueous polymer microsuspension with a D84/D50 particle size distribution of 1.8 or less, at least about 80 percent of a composition comprising 100 parts by volume of a normally solid polymer, an amount of water which is sufficient to form a polymer-continuous heterogeneous composition and which is insufficient to form an aqueous-phase-continuous composition and an amount of an emulsifying agent sufficient to permit formation of the polymer-continuous heterogeneous composition to a maximum shear which differs by less than about 15 percent from the average of the maximum shear which is imparted to all of such polymer, water and emulsifying agent composition;

(b) converting the resulting polymer-continuous heterogeneous composition to an aqueous-phase-continuous heterogeneous composition having a discontinuous polymer phase by adding to such polymer-continuous composition an amount of water sufficient to convert the polymer-continuous composition to a polymer-discontinuous composition; and (c) cooling the resulting aqueous-phase-continuous heterogeneous composition to below the melting point of the polymer.

17. The process of claim 16 wherein the maximum shear imparted to the polymer-continuous composition in step (a) is sufficient to provide the dispersed polymer particles of the final aqueous polymer microsuspension with a volume average particle size of from about 0.1 to about 50 microns.

18. The process of claim 16 wherein the maximum shear imparted to the polymer-continuous composition in step (a) is between about 25 and about 5,000 reciprocal seconds.

* * * * *